United States Patent
Mori et al.

(10) Patent No.: US 9,676,579 B2
(45) Date of Patent: Jun. 13, 2017

(54) MANUFACTURING METHOD FOR A GLASS ROLL AND MANUFACTURING APPARATUS FOR A GLASS ROLL

(75) Inventors: Koichi Mori, Otsu (JP); Akio Nakabayashi, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 66 days.

(21) Appl. No.: 13/473,009

(22) Filed: May 16, 2012

(65) Prior Publication Data

US 2012/0318024 A1     Dec. 20, 2012

(30) Foreign Application Priority Data

May 19, 2011 (JP) .................................. 2011-112243

(51) Int. Cl.
| | |
|---|---|
| B65G 49/06 | (2006.01) |
| C03B 17/06 | (2006.01) |
| C03B 35/14 | (2006.01) |
| B65H 23/195 | (2006.01) |

(52) U.S. Cl.
CPC .......... B65H 23/195 (2013.01); B65G 49/06 (2013.01); C03B 17/06 (2013.01); B65H 2801/61 (2013.01)

(58) Field of Classification Search
CPC ....... C03B 17/068; C03B 15/00; C03B 17/00; C03B 17/06; C03B 17/061; C03B 35/14; C03B 35/181; B65G 17/32; B65G 49/06; B65G 49/065; B65G 49/064
USPC ...................................................... 65/90, 193
See application file for complete search history.

(56) References Cited

U.S. PATENT DOCUMENTS

| | | | | |
|---|---|---|---|---|
| 1,681,258 | A | * | 8/1928 | Rowley .............................. 65/91 |
| 1,753,768 | A | * | 4/1930 | Blair ..................... C03B 17/064 |
| | | | | 65/195 |
| 2,505,103 | A | * | 4/1950 | Devol ........................... 65/25.3 |
| 4,765,554 | A | | 8/1988 | Tuffal et al. |

(Continued)

FOREIGN PATENT DOCUMENTS

| | | | |
|---|---|---|---|
| JP | 61094913 A | * | 5/1986 |
| JP | 62-222955 | | 9/1987 |

(Continued)

OTHER PUBLICATIONS

Tire Technology, "Rubber Friction", Jan. 2004, http://insideracingtechnology.com/tirebkexerpt1.htm.*
Doug Davis, "Friction", 2002, Eastern Illinois University, http://www.ux1.eiu.edu/~cfadd/1150/04Nwtn/frict.html.*

(Continued)

*Primary Examiner* — Cynthia Szewczyk
(74) *Attorney, Agent, or Firm* — Wenderoth, Lind & Ponack, L.L.P.

(57) ABSTRACT

A manufacturing method for a glass roll includes drawing a glass film downward vertically from a forming device, converting a delivery direction of the glass film from a vertical direction to a horizontal direction, continuously delivering the glass film to a downstream side by a horizontal conveyance section, and rolling the glass film into a roll shape on a downstream side of the horizontal conveyance section. While the glass film is supported in surface contact by an endless belt serving as a support section, which is provided in the horizontal conveyance section, a rolling force equal to or less than a static friction force, which is generated by a self-weight of the glass film between the glass film and the endless belt, is imparted to the glass film.

5 Claims, 3 Drawing Sheets

(56) References Cited

U.S. PATENT DOCUMENTS

| | | | |
|---|---|---|---|
| 5,901,777 A * | 5/1999 | Matsumura | B21B 1/463 164/475 |
| 6,101,845 A | 8/2000 | Kojima et al. | |
| 6,311,523 B1 | 11/2001 | Kojima et al. | |
| 6,502,423 B1 * | 1/2003 | Ostendarp et al. | 65/29.14 |
| 2005/0178159 A1 * | 8/2005 | Shiraishi | C03B 17/062 65/182.2 |
| 2011/0059296 A1 * | 3/2011 | Wada | C03B 33/037 428/157 |
| 2011/0177290 A1 | 7/2011 | Tomamoto et al. | |
| 2011/0177325 A1 | 7/2011 | Tomamoto et al. | |
| 2011/0177347 A1 | 7/2011 | Tomamoto et al. | |
| 2011/0192878 A1 | 8/2011 | Teranishi et al. | |
| 2011/0200812 A1 | 8/2011 | Tomamoto et al. | |
| 2011/0217521 A1 * | 9/2011 | Teranishi et al. | 428/189 |
| 2012/0090357 A1 * | 4/2012 | Nakamura et al. | 65/95 |

FOREIGN PATENT DOCUMENTS

| | | |
|---|---|---|
| JP | 9-295819 | 11/1997 |
| JP | 2005-116611 | 4/2005 |
| JP | 2007-119322 | 5/2007 |
| JP | 2008-056486 | 3/2008 |
| JP | 2009-280384 | 12/2009 |
| JP | 2010-132531 | 6/2010 |
| JP | 2012-031031 | 2/2012 |
| WO | 2010/038757 | 4/2010 |

OTHER PUBLICATIONS

International Search Report issued Jun. 12, 2012 in corresponding International (PCT) Application No. PCT/JP2012/062399.
International Preliminary Report on Patentability issued Nov. 28, 2013 and Written Opinion in International Application No. PCT/JP2012/062399.

* cited by examiner

MANUFACTURING METHOD FOR A GLASS ROLL AND MANUFACTURING APPARATUS FOR A GLASS ROLL

TECHNICAL FIELD

The present invention relates to an improvement of a technology for manufacturing a glass roll.

BACKGROUND ART

In recent years, a CRT display as an image display device has been gradually replaced by a flat panel display (FPD), which is lighter and thinner than the CRT display, such as a liquid crystal display (LCD), a plasma display (PDP), or an organic light-emitting diode (OLED) display. Further lightening of any such FPD is being promoted, and hence there arises a need for further thinning a glass substrate corresponding to one of the main components of the FPD.

Further, for example, there is a growing use of an organic light-emitting diode not only for applications to a display that uses TFTs to blink light of three primary colors, but also as a plane light source, such as a backlight of the LCD and a light source for interior illumination, which emits only monochrome (for example, white) light. An illumination device that uses the organic light-emitting diode as alight source may have a freely deformable light-emitting surface as long as the organic light-emitting diode is constructed of a flexible glass substrate. Therefore, from the viewpoint of ensuring sufficient flexibility, there is also promoted further thinning of the glass substrate to be used for this type of illumination device.

Therefore, as described in, for example, Patent Literature 1 below, there has been developed a film-like thin glass sheet (glass film) having a thickness of several hundreds of micrometers or less. In general, as described also in Patent Literature 1, this type of glass film is successively formed by a forming device that employs a so-called downdraw method. For example, a delivery direction of the elongated glass film thus successively formed is converted from a vertical direction to a horizontal direction, and then, during a period in which a horizontal conveyance section of a conveyance device continuously delivers the glass film to a downstream side, both widthwise end portions of the glass film are cleaved as necessary. Then, the glass film is introduced into a cutting step for obtaining a thin glass sheet having a predetermined dimension, or a rolling step for obtaining a glass roll.

Note that, the glass roll has an advantage of higher workability in packaging and shipping as compared to the thin glass sheet cut into a predetermined dimension. Further, in the case of the glass roll, a so-called roll-to-roll system can be employed so that cleaning, drying, and antistatic processes can be performed successively for the glass film (see FIGS. 12 and 13 of Patent Literature 1), and further a functional film can be formed successively on an effective surface of the glass film in a subsequent step or at a panel manufacturer (see Patent Literature 2 below). Thus, the glass roll also has an advantage in that various kinds of processes can be executed efficiently for the glass film. As described above, the glass roll has many advantages, and therefore a demand therefor is rapidly increasing.

By the way, when the glass film is sequentially rolled into a roll shape under a state in which a tensile force is not sufficiently imparted to the glass film, portions of the rolled glass film cannot be brought into close contact with each other, and so-called weaving is likely to occur due to an effect of, for example, vibrations to be applied during transportation. When the weaving has occurred, in a case where the glass film is unrolled from the glass roll and a predetermined process (processing) is executed for the unrolled glass film, the unrolled glass film is displaced in an axial direction of a roll core. Therefore, when such a glass roll is introduced into various processing devices in the roll-to-roll system, distortion is accumulated in the unrolled glass film because various members constituting the processing devices are positionally fixed. Such accumulation of the distortion may increase a risk of damage to the glass film. Thus, when obtaining the glass roll, it is desired that the glass film be rolled under a state in which an appropriate tensile force is imparted to the glass film so as to prevent the weaving.

As a specific method for rolling an elongated film-like workpiece while imparting an appropriate tensile force to the workpiece, methods described in Patent Literatures 3 and 4 below may be taken as examples. In the method described in Patent Literature 3, while a roll for unrolling a glass film and a roll for rolling a glass film are rotationally driven in opposite directions, and in this state, nip rolls interposed between the roll for unrolling a glass film and the roll for rolling a glass film impart a delivery force toward the roll for rolling a glass film from the roll for unrolling a glass film to the film-like workpiece unrolled. That is, in this method, rotational speed, torque, and the like of each of the roll for unrolling a glass film, the roll for rolling a glass film, and the nip rolls are set (managed) appropriately so that an appropriate tensile force is imparted to the film-like workpiece, and in this state, the rolling and unrolling of the film-like workpiece are progressed. In the method described in Patent Literature 4, suction rolls are interposed between the roll for unrolling a glass film and the roll for rolling a glass film. Each suction roll has innumerable holes in its outer peripheral surface, and is capable of sucking the film-like workpiece toward the outer peripheral surface by setting an interior of the suction roll to a negative pressure state.

CITATION LIST

Patent Literature 1: JP 2010-132531 A
Patent Literature 2: JP 2007-119322 A
Patent Literature 3: JP 2008-56486 A
Patent Literature 4: JP 2005-116611 A

SUMMARY OF INVENTION

Technical Problems

In a case where the glass film drawn downward vertically from the forming device is successively rolled by a rolling device provided on a downstream side of the forming device, the successive forming of the glass film by the forming device and the rolling of the glass film by the rolling device are progressed simultaneously, and hence, when a rolling force of the rolling device (pulling force for pulling the glass film to the downstream side) is increased, accuracy of forming the glass film is adversely affected. Thus, it is difficult to impart a sufficient tensile force to the glass film. Even in a case of employing the method described in Patent Literature 3 above, when the glass film is nipped by the nip rolls from both upper and lower sides, surface quality of the glass film may be degraded. In view of the fact that the glass film is a brittle material, when the glass film is nipped by the nip rolls from both the upper and lower sides, the glass film may be damaged due to a pressing force of the nip rolls (nipping force between the two rolls). In particular, the recent further thinning of the glass film has increased the risk of damage to the glass film, and thus the method of nipping the glass film by the nip rolls from both the upper and lower sides cannot be employed.

In the method described in Patent Literature 4, in which the suction rolls are used, as illustrated in, for example, FIG. 1 of Patent Literature 4, in order to ensure a sufficient contact area between each suction roll and the glass film (to impart a sufficient tensile force to the glass film), it is necessary to bend the glass film between the roll for unrolling a glass film and the roll for rolling a glass film (to abruptly change the traveling direction of the glass film). The glass film is highly flexible, but is highly likely to break when being bent during transportation. Thus, such a method cannot be employed as well.

In view of the above-mentioned circumstances, the present invention has an object to enable an appropriate tensile force to be imparted to an elongated glass film that is rolled into a roll shape on a downstream side of a forming device without adversely affecting accuracy of forming the glass film, to thereby enable easy and stable manufacture of a glass roll having a low risk of weaving at the time of transportation or the like.

Solution to Problems

According to the present invention made in order to achieve the above-mentioned object, there is provided a manufacturing method for a glass roll, comprising: drawing a glass film downward vertically from a forming device; converting a delivery direction of the glass film from a vertical direction to a horizontal direction; continuously delivering the glass film to a downstream side by a horizontal conveyance section extending in the horizontal direction; and rolling the glass film into a roll shape on a downstream side of the horizontal conveyance section, wherein, while the glass film is supported in surface contact by a support section provided in the horizontal conveyance section, a rolling force equal to or less than a static friction force, which is generated by a self-weight of the glass film between the glass film and the support section, is imparted to the glass film.

With this structure, in a part of contact between the glass film and the support section (region supported by the support section), the glass film can be prevented, to the extent possible, from moving relative to the support section. Accordingly, the rolling operation can be progressed under a state in which a tensile force is imparted to a region of the glass film continuously delivered to the downstream side, which is interposed on the downstream side of the horizontal conveyance section (between the support section and the rolling device). Thus, the glass film can be rolled securely, and as a result, a glass roll having a low risk of weaving at the time of transportation or the like can be obtained.

Further, the glass film is supported in surface contact by the support section provided in the horizontal conveyance section, and hence a relatively large static friction force can be ensured between the glass film and the support section. The tensile force is imparted to the glass film (or partial region thereof on the downstream side) by utilizing the static friction force (maximum static friction force), which is generated by the self-weight of the glass film between the glass film and the support section of the horizontal conveyance section, and hence the accuracy of successively forming the glass film is less adversely affected. Further, the glass film is delivered to the downstream side under a state in which the movement of the glass film relative to the support section of the horizontal conveyance section is restricted, and hence a small defect is prevented, to the extent possible, from being formed in a surface (effective surface) of the glass film along with sliding between the glass film and the support section. Further, there is no need to nip the glass film by the nip rolls from both the upper and lower sides, or bend the glass film to ensure a contact area between the suction roll and the glass film, and hence the degradation in surface quality of the glass film can be prevented effectively, and therefore the damage to the glass film can be prevented effectively. As described above, according to the present invention, a high-quality glass film can be obtained, and the glass film is rolled securely. Further, a high-quality glass roll having a low risk of weaving at the time of transportation or the like can be manufactured easily and stably.

In the above-mentioned structure, there may be used the horizontal conveyance section comprising: a support sheet serving as the support section; and a drive section for driving the support sheet in contact with the support sheet. In this case, after a state of contact between the support sheet and the glass film is released, drive by the drive section may be released, and the support sheet may be moved to a retreating position that is spaced apart from the drive section.

As described above, after the state of contact between the support sheet and the glass film is released, the drive by the drive section is released, and the support sheet moves to the retreating position that is spaced apart from the drive section. Thus, the support sheet can be set disposable. Accordingly, soil and foreign matter adhering to the support sheet when the support sheet supports the glass film in surface contact can reliably be prevented from adhering to the glass film (subsequent glass film). Therefore, the quality of the glass film and therefore the quality of the glass roll can further be enhanced.

In the above-mentioned structure, the drive section may drive a part of the support sheet, which is supporting the glass film in surface contact, under a state in which movement of the part of the support sheet relative to the drive section in a width direction of the glass film is restricted.

Even when the movement of the glass film relative to the support section (support sheet) can be prevented to the extent possible by employing the structure of the present invention, if the support sheet, which is supporting the glass film in surface contact, moves relative to the drive section in the width direction of the glass film, accuracy of rolling the glass film (quality of the glass roll as a product) or the like may adversely be affected. To address this, when the above-mentioned structure is employed, the support sheet and the glass film supported in surface contact by the support sheet can be prevented, to the extent possible, from moving relative to the drive section in the width direction thereof, and hence the accuracy of rolling the glass film can be enhanced.

In the above-mentioned structure, the support section to be used is desirably a support section having a coefficient of static friction on the glass film of 1.0 or more.

The reason for the above description is as follows. The inventors of the present invention have pursued studies and found as a result that, with the use of the support section having a coefficient of static friction on the glass film of 1.0 or more, a tensile force sufficient to effectively reduce the frequency of weaving can be imparted to the glass film [see experimental results described later (Tables 1 and 2)].

In the above-mentioned structure, the forming device is desirably a forming device for forming the glass film by an overflow downdraw method or a redraw method.

The successively formed glass film is processed into a glass substrate to be used, for example, for an FPD and a solar cell, and a functional film (minute element and wiring) is formed on a surface of the glass substrate. Therefore, the glass film needs to have a high flatness. In this regard, with use of the overflow downdraw method, the glass film is successively formed under a state in which the surface is simply brought into contact with outside air (atmospheric gas), and hence it is possible to ensure a high flatness of the glass film as compared to a forming method using a nozzle, such as a slot downdraw method. Further, in the redraw method, a temporarily solidified glass base material for secondary processing is heated and drawn to successively form the glass film, and an effect similar to that of the overflow downdraw method can be obtained.

The above-mentioned structure may be preferably applied to a case where the forming device is a forming device for forming the glass film having a thickness of 1 µm or more and 300 µm or less. The reason for the above description is as follows. That is, when the nip rolls as described in Patent Literature 3 are used in a case of successively forming a thin glass film having a thickness of 300 µm or less, the risk of damage to the glass film or the like may be increased. Thus, the present invention may be applied particularly preferably to a case of obtaining a glass roll by successively forming a glass film having a thickness of 300 µm or less, preferably 200 µm or less, and rolling the glass film into a roll shape by the rolling device.

In addition, when the glass film is rolled into a roll shape, a protective film (protective sheet) for protecting the surface of the glass film may be laminated on the glass film, and in this state, the resultant laminate may be rolled into a glass roll. At this time, a tensile force may be imparted to the protective film, but is not necessarily imparted thereto.

Further, the above-mentioned object may be achieved also by a manufacturing apparatus for a glass roll, comprising: a horizontal conveyance section for delivering, in a horizontal direction, a glass film, which is drawn downward vertically from a forming device and is delivered in a delivery direction converted from a vertical direction to the horizontal direction; and a rolling device provided on a downstream side of the horizontal conveyance section, for rolling the glass film, which is continuously delivered to the downstream side by the horizontal conveyance section, into a roll shape, wherein the horizontal conveyance section comprises a support section capable of supporting the glass film in surface contact, and wherein a rolling force of the rolling device for the glass film is set equal to or less than a static friction force, which is generated by a self-weight of the glass film between the glass film and the support section.

The reason for the above description is as follows. That is, with the manufacturing apparatus for a glass roll according to the present invention, which has the structure as described above, it is possible to produce an effect similar to that in the case of employing the above-mentioned manufacturing method for a glass roll according to the present invention.

Advantageous Effects of Invention

As described above, according to the present invention, it is possible to impart an appropriate tensile force to the elongated glass film that is rolled into the roll shape on the downstream side of the forming device without adversely affecting the accuracy of forming the glass film. Thus, it is possible to easily and stably manufacture the glass roll having a low risk of weaving.

DESCRIPTION OF EMBODIMENTS

Hereinafter, embodiments of the present invention are described with reference to the drawings.

Figure 1:
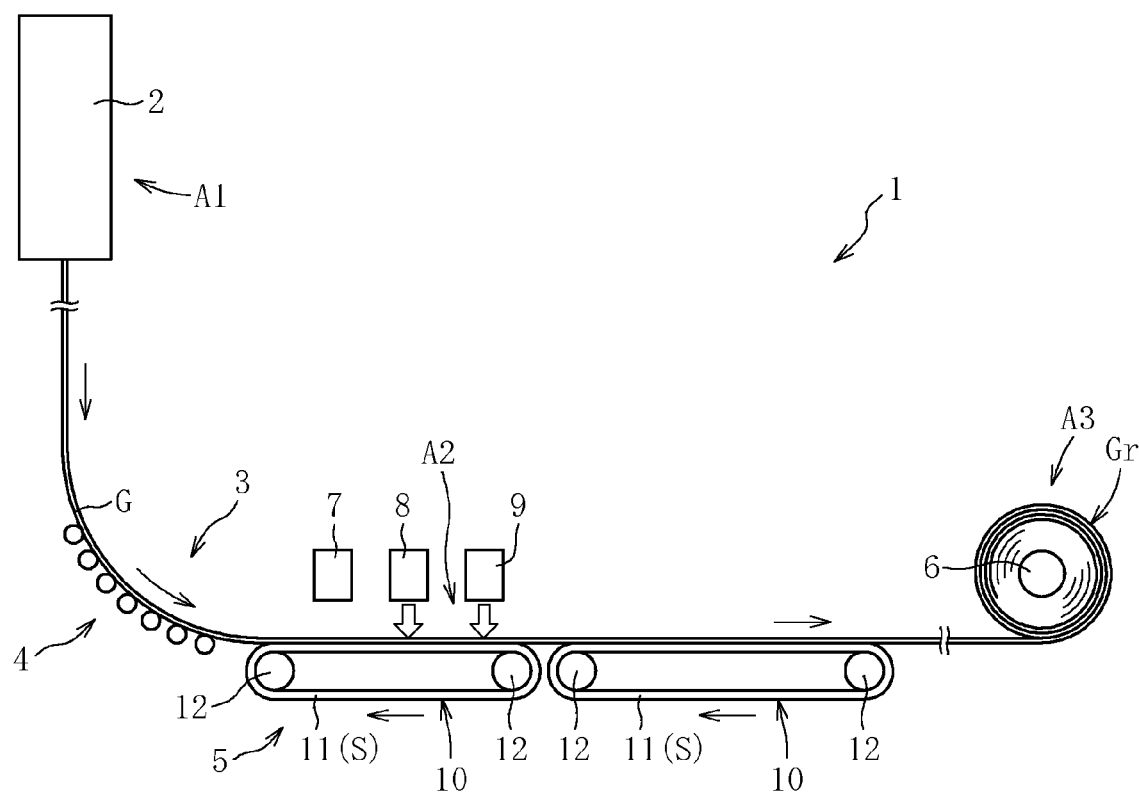
FIG. 1 A schematic side view of a manufacturing apparatus to be used for implementing a manufacturing method for a glass roll according to an embodiment of the present invention.

FIG. 1 is a schematic side view of a manufacturing apparatus 1 to be used for implementing a manufacturing method for a glass roll according to the present invention. The manufacturing apparatus 1 mainly comprises, in the following order from an upstream side to a downstream side, a forming area A1, a cleaving area A2, and a rolling area A3 which are described below.

The forming area A1 is an area for forming an elongated glass film G, and a forming device 2 is provided in this area. As the forming device 2, there is herein used a forming device for forming the glass film G by a so-called overflow downdraw method, in which molten glass is successively drawn downward vertically. In the overflow downdraw method, the forming of the glass film G proceeds under a state in which the surface thereof is only held in contact with outside air (atmospheric gas in the forming device 2), and hence high flatness can be ensured for the surface of the glass film G. Therefore, there is an advantage that, in a case where the glass film G is used as, for example, a glass substrate for an FPD, it becomes easy to form fine elements and wiring on the surface thereof with high precision.

Note that, in the drawings including FIG. 1 which illustrate the embodiments of the present invention, the thickness of the glass film G is exaggerated, and the actual thickness of the glass film G is 300 µm or less (1 µm or more and 300 µm or less). In other words, the present invention may be employed particularly suitably in a case where successive forming of a glass film G having a thickness of 300 µm or less, preferably 200 µm or less, more preferably 100 µm or less, and rolling of the glass film G are simultaneously progressed.

The glass film G drawn downward vertically from the forming device 2 is transferred to a conveyance device 3 for delivering the glass film G in a longitudinal direction thereof to the downstream side. At the end of the upstream portion of the conveyance device 3, a curved conveyance section 4 curved into an arc shape is provided, and the glass film G drawn downward vertically from the forming device 2 is delivered along the curved conveyance section 4 to the downstream side, with the result that a traveling direction of the glass film G is converted from a vertical direction to a horizontal direction. A horizontal conveyance section 5 that constructs the conveyance device 3 together with the curved conveyance section 4 is connected at its upstream end to a downstream end of the curved conveyance section 4, and the glass film G delivered along the horizontal conveyance section 5 to the downstream side is first introduced into the cleaving area A2.

The horizontal conveyance section 5 of this embodiment comprises two conveyors 10 linearly arranged in the longitudinal direction of the glass film G. Each of the conveyors 10 mainly comprises an endless belt 11 arranged to be opposed to a lower surface of the glass film G, rotators 12 and 12 arranged apart from each other at two positions in the longitudinal direction of the glass film G and held in contact with an inner surface of the endless belt 11, and a drive source (not shown) for rotationally driving at least one of the two rotators 12 and 12. That is, in this embodiment, the endless belt 11 functions as a support section S for supporting the glass film G in surface contact, and the rotator 12 functions as a drive section for driving the endless belt 11. As the endless belt 11, there is used a polyurethane belt having a widthwise dimension larger than a widthwise dimension of the glass film G and having a coefficient $\mu$ of static friction on the glass film G of 1.0 ($\mu$=1.0). A drive speed of each conveyor 10 is set substantially equal to a forming rate of the glass film G (flow-down rate of the glass film G from the forming device 2).

In the cleaving area A2, there is executed a cleaving process, in which the glass film G delivered along the horizontal conveyance section 5 to the downstream side is successively cleaved along a preset cleaving line (not shown) extending in the longitudinal direction (delivery direction), to thereby divide the glass film G into a product glass portion and an unnecessary glass portion. In the above-mentioned overflow downdraw method, in a widthwise central region of the glass film G, the accuracy is ensured to the extent that the widthwise central region is available as a glass product, but in widthwise end regions (both end regions in the width direction) of the glass film G, the accuracy is not ensured to the extent that the widthwise end region is available as a glass product, in many cases. Therefore, the glass film G is divided into the product glass portion, which is to be processed into a glass product, and the unnecessary glass portion, which is to be collected or discarded, by providing the above-mentioned cleaving area A2 in which the cleaving process is executed. Note that, in the figures illustrating the embodiments of the present invention (FIGS. 1 to 4), the product glass portion and the unnecessary glass portion are not distinguished from each other.

In the cleaving area A2, a laser irradiation device 8 and cooling means 9 are disposed in the stated order. The laser irradiation device 8 serves as localized heating means for locally heating the preset cleaving line (or region in which the preset cleaving line is present) extending in the longitudinal direction of the glass film G. The cooling means 9 is configured to cool the heated portion of the glass film G. Accordingly, so-called laser cleaving is executed. On an upstream side of the laser irradiation device 8, crack forming means 7 such as a diamond cutter or a laser irradiation device is provided.

When a longitudinal end portion of the glass film G delivered along the horizontal conveyance section 5 to the downstream side reaches a region opposed to the crack forming means 7, an initial crack serving as a cleaving start point is formed by the crack forming means 7 in a predetermined widthwise position of the longitudinal end portion of the glass film G. When the glass film G having the initial crack formed therein is further delivered to the downstream side so that the longitudinal end portion of the glass film G reaches a region opposed to the laser irradiation device 8, the laser irradiation device 8 starts to irradiate (the initial crack of) the glass film G with a laser. Subsequently, the glass film G is further delivered to the downstream side while being kept irradiated with the laser. Accordingly, a predetermined widthwise portion of the glass film G is locally heated successively. When the heated portion of the glass film G passes through a region opposed to the cooling means 9, the heated portion of the glass film G is cooled, and by a thermal stress generated along therewith, the initial crack is propagated in a thickness direction of the glass film G. Thus, the division of the glass film G at this portion is completed. As described above, the elongated glass film G is successively cleaved along the preset cleaving line extending in the longitudinal direction thereof, and is divided into the product glass portion and the unnecessary glass portion. The product glass portion is continuously delivered along the horizontal conveyance section 5 to the downstream side. On the other hand, although the illustration is omitted, the delivery direction of the unnecessary glass portion is changed so that the unnecessary glass portion is separated from the product glass portion, and is introduced into a collecting device or a shattering/collecting device.

In the rolling area A3, the glass film G (or product glass portion thereof) continuously delivered along the horizontal conveyance section 5 to the downstream side is rolled into a roll shape by a rolling device 6 provided on a downstream side of the horizontal conveyance section 5, and accordingly a glass roll Gr is obtained. A rolling force to be applied to the glass film G from the rolling device 6 is set equal to or less than a static friction force, which is generated by the self-weight of the glass film G between the glass film G and each endless belt 11 (support section S). That is, a rolling force equal to or less than the static friction force, which is generated by the self-weight of the glass film G between the glass film G and each endless belt 11, is imparted to the glass film G.

As described above, the glass film G continuously delivered to the downstream side is supported in surface contact by the endless belts 11 each serving as the support section S provided in the horizontal conveyance section 5, and the rolling force equal to or less than the static friction force, which is generated by the self-weight of the glass film G between the glass film G and each endless belt 11, is imparted to the glass film G. As a result, a region of the glass film G delivered to the downstream side, which is supported by the endless belts 11 (region held in contact with the endless belts 11), can be prevented, to the extent possible, from moving relative to the endless belts 11. Accordingly, the rolling operation can be progressed under a state in which a tensile force is imparted to a region of the glass film G continuously delivered to the downstream side, which is interposed between the horizontal conveyance section 5 and the rolling device 6. Thus, the glass film G can be rolled securely, and as a result, a glass roll Gr having a low risk of weaving at the time of transportation or the like can be obtained.

Further, the glass film G is supported in surface contact by the endless belts 11 each serving as the support section S, and hence a relatively large static friction force can be ensured between the glass film G and each endless belt 11. In particular, with use of the endless belt 11 having a coefficient $\mu$ of static friction on the glass film G of 1.0 or more (in this embodiment, $\mu$=1.0), a tensile force sufficient to effectively reduce the frequency of weaving can be imparted to the glass film G. Further, the tensile force is imparted to the glass film G (or region thereof on the downstream side) by utilizing the static friction force, which is generated by the self-weight of the glass film G between the glass film G and each endless belt 11, and hence the accuracy of forming the glass film G is less adversely affected. Further, the glass film G is delivered to the downstream side under a state in which the movement of the glass film G relative to the endless belts 11 is restricted. Accordingly, a small defect is prevented, to the extent possible, from being formed in an effective surface of the glass film G along with sliding between the glass film G and each endless belt 11, and further, accuracy of cleaving both the widthwise end portions of the glass film G is enhanced. Further, there is no need to nip the glass film G by the nip rolls from both the upper and lower sides, or bend the glass film G to ensure a sufficient contact area between the suction roll and the glass film G. Accordingly, the degradation in surface quality of the glass film G can be prevented effectively, and further, the damage to the glass film G can be prevented effectively.

As described above, according to the present invention, a high-quality glass film G (product glass portion) can be obtained, and the glass film G is rolled securely. Further, a high-quality glass roll Gr having a low risk of weaving at the time of transportation or the like can be manufactured easily and stably.

Figure 2:
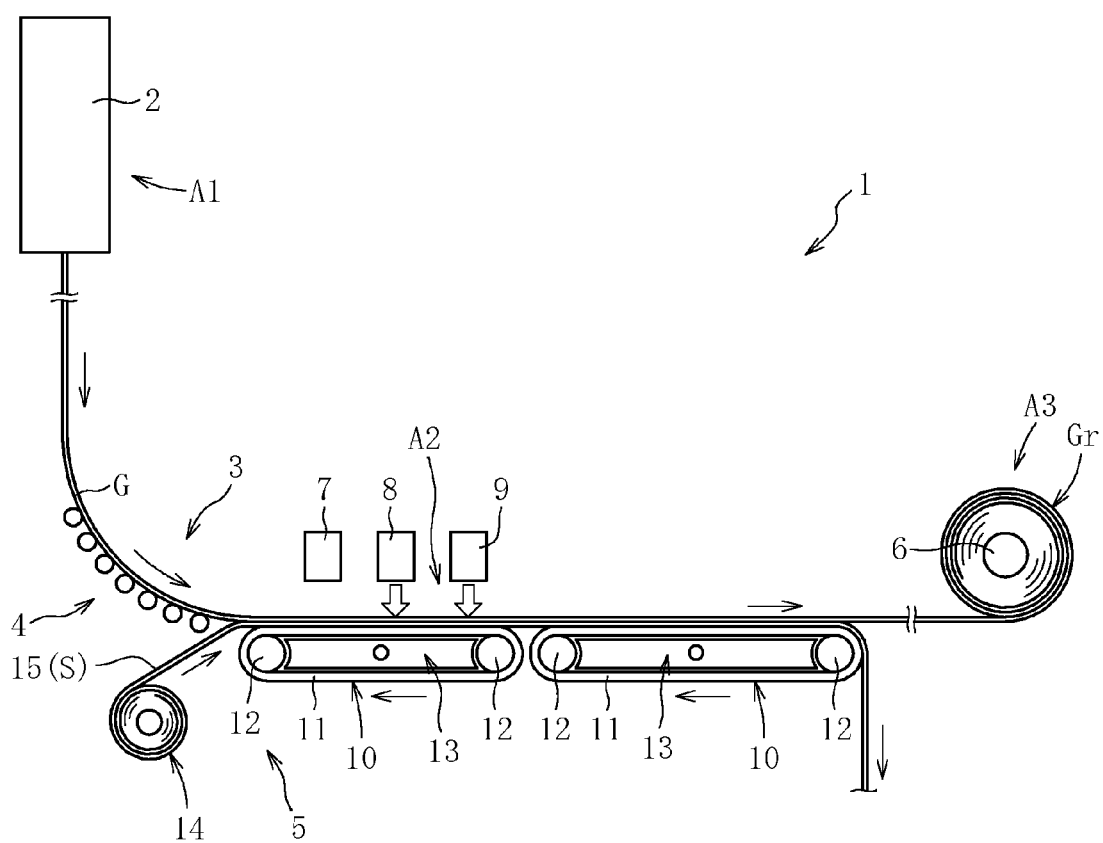
FIG. 2 A schematic side view of a manufacturing apparatus to be used for implementing a manufacturing method for a glass roll according to another embodiment of the present invention.

FIG. 2 is a schematic side view of a manufacturing apparatus 1 to be used for implementing a manufacturing method for a glass roll according to another embodiment of the present invention. The manufacturing apparatus 1 illustrated in FIG. 2 is common to the manufacturing apparatus 1 illustrated in FIG. 1 in that the forming area A1, the cleaving area A2, and the rolling area A3 are provided in combination in a range from the upstream side toward the downstream side, but is different from the manufacturing apparatus 1 illustrated in FIG. 1 in the structure of the horizontal conveyance section 5 (manner of delivering the glass film G by the horizontal conveyance section 5).

Specifically, in this embodiment, a support sheet 15 fed from a support sheet roll 14 is interposed between the glass film G and each endless belt 11. When a drive force of the rotator 12 is imparted to the support sheet 15 via the endless belt 11, the glass film G is delivered to the downstream side under a state in which the glass film G is supported in surface contact. That is, in this embodiment, the support sheet 15 functions as the support section S, and the endless belt 11 and the rotator 12 (conveyor 10) function as the drive section.

In this case, the support sheet 15 is a foamed polyethylene sheet having a coefficient μ of static friction on the glass film G of 3.2 (μ=3.2), and a widthwise dimension thereof is set larger than the widthwise dimension of the glass film G to be supported. The support sheet 15 is fed from the support sheet roll 14 and is introduced between the glass film G and each endless belt 11. Further, the support sheet 15 is interposed between the glass film G and each endless belt 11, and moves integrally with the endless belts 11 under a state in which the glass film G is supported in surface contact. After the state of surface contact between the support sheet 15 and the glass film G is released (after a part of the longitudinal region of the glass film G that has been supported in surface contact is delivered to the downstream side of the horizontal conveyance section 5), the drive by the drive section is released, and the support sheet 15 moves to a retreating position that is spaced apart from the drive section. In FIG. 2, after the state of surface contact between the support sheet 15 and the glass film G is released, the support sheet 15 moves downward vertically, and is then collected and discarded. That is, the support sheet 15 is set disposable.

Figure 3:
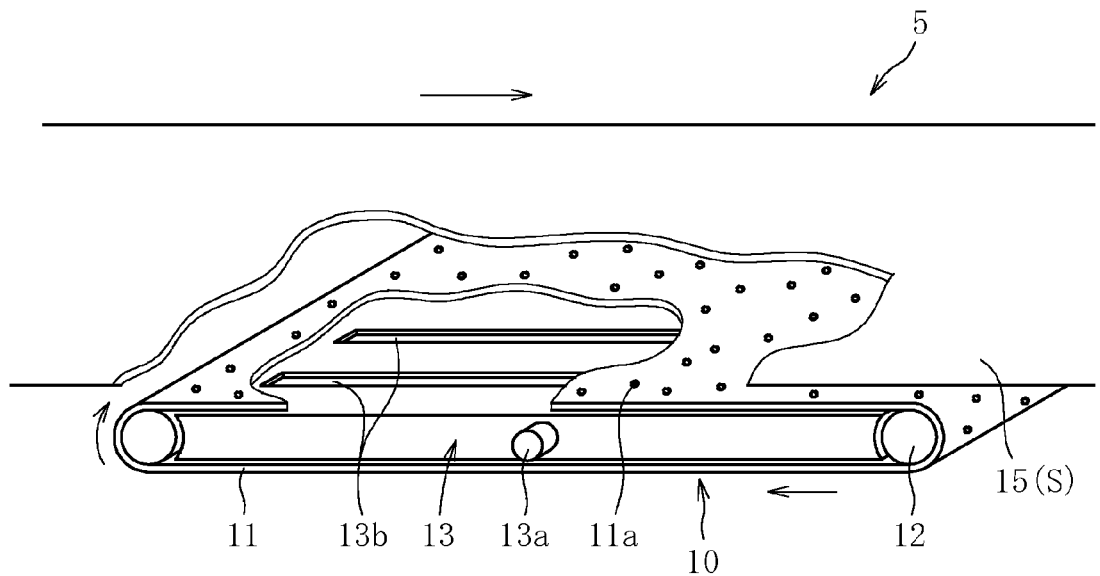
FIG. 3 A schematic perspective view of a main part of the manufacturing apparatus illustrated in FIG. 2.

Further, the horizontal conveyance section 5 of this embodiment comprises restriction means for restricting movement of the support sheet 15, which is supporting the glass film G in surface contact, relative to the drive section in the width direction of the glass film G. As illustrated in FIG. 3, the restriction means mainly comprises a chamber 13 disposed on the inner side of the endless belt 11, and a suction blower (not shown) for setting an interior of the chamber 13 to a negative pressure state. The suction blower is connected to a connection portion 13a provided on a side surface of the chamber 13 via an air hose (not shown). Further, the endless belt 11 is provided with innumerable through holes 11a, and the chamber 13 is provided with suction holes 13b in an upper surface thereof. Therefore, when the interior of the chamber 13 is set to the negative pressure state through an operation of the suction blower (not shown), a drawing force is applied to the support sheet 15 via the suction holes 13b provided in the upper surface of the chamber 13 and the through holes 11a provided in the endless belt 11, and accordingly the support sheet 15 interposed between the glass film G and the endless belt 11 is sucked toward the endless belt 11.

As described above, in this embodiment, after the state of contact between the support sheet 15 serving as the support section S and the glass film G is released, the drive by the drive section is released, and the support sheet 15 moves to the retreating position that is spaced apart from the drive section. That is, the support sheet 15 is set disposable, and accordingly soil and foreign matter adhering to the support sheet 15 when the support sheet 15 supports the glass film G in surface contact can be prevented from adhering (re-adhering) to the subsequent glass film G. Therefore, the quality of the glass film G (product glass portion) and therefore the quality of the glass roll Gr can further be enhanced. Further, in this embodiment, the above-mentioned restriction means is provided so as to restrict the movement of the support sheet 15, which is supporting the glass film G in surface contact, relative to the drive section in the width direction of the glass film G. Accordingly, the support sheet 15 and the glass film G supported in surface contact by the support sheet 15 can be prevented, to the extent possible, from moving relative to the drive section in the width direction thereof, and hence the accuracy of rolling the glass film G by the rolling device 6 can be enhanced.

Figure 4:
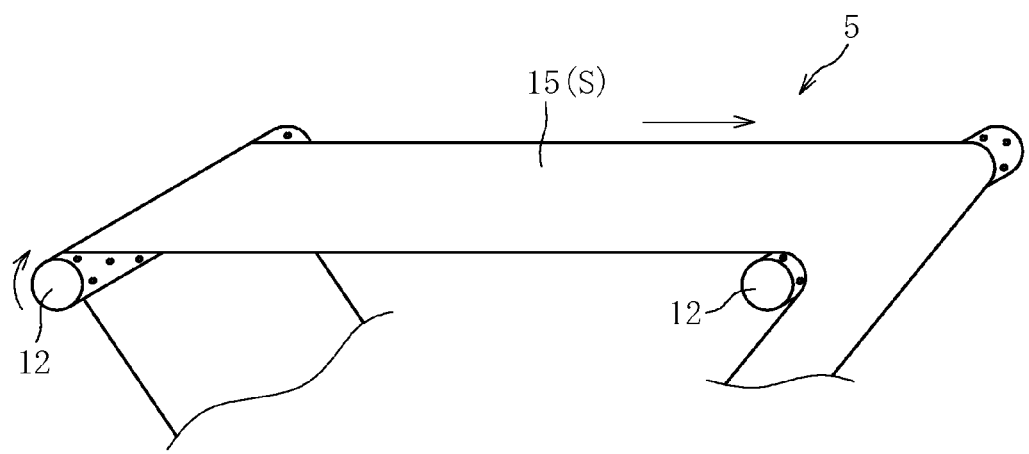
FIG. 4 A schematic perspective view of a main part of the manufacturing apparatus illustrated in FIG. 2 according to a modified example of the present invention.

FIG. 4 illustrates a modified example of the horizontal conveyance section 5, which may produce an effect similar to that of the horizontal conveyance section 5 (conveyor 10) illustrated in FIG. 3 with a simpler structure than that of the horizontal conveyance section 5 specifically illustrated in FIG. 3. Specifically, the support sheet 15 fed from the support sheet roll (not shown) is looped around the two rotators 12 arranged apart from each other in the delivery direction of the glass film G, to thereby directly impart the drive force of the rotator 12 to the support sheet 15.

That is, in this embodiment, the support sheet 15 functions as the support section S, and the rotator 12 functions as the drive section. Further, the glass film G is supported in the state of surface contact at a part of the support sheet 15 which is interposed between the two rotators 12 and 12, and the drive force is imparted from the rotator 12 to the support sheet 15, with the result that the glass film G is delivered to the downstream side. Further, the rotator 12 of this embodiment is a so-called suction roll provided with a large number of suction holes in a surface thereof, and the support sheet 15 held in contact with the rotator 12 is sucked toward the rotator 12. Therefore, the support sheet 15 serving as the support section S and the glass film G supported in surface contact by the support sheet 15 can be prevented, to the extent possible, from moving relative to the drive section in the width direction thereof, and hence the accuracy of rolling the glass film G by the rolling device 6 can be enhanced.

Further, in this embodiment, after the state of surface contact between the support sheet 15 and the glass film G is released (after the part of the longitudinal region of the glass film G that has been supported in surface contact therewith is delivered to the downstream side of the horizontal conveyance section 5), the drive by the drive section (rotator 12) is released, and the support sheet 15 moves to the retreating position that is spaced apart from the drive section. In this case, after the state of surface contact between the support sheet 15 and the glass film G is released, the support sheet 15 moves downward vertically, and is then collected and discarded. Thus, soil and foreign matter adhering to the support sheet 15 when the support sheet 15 supports the glass film G in surface contact therewith can be prevented from adhering (re-adhering) to the subsequent glass film G. Therefore, the quality of the glass film G (product glass portion) and therefore the quality of the glass roll Gr can further be enhanced.

In the above description, the present invention is applied to the case of using the forming device 2 for successively forming the glass film G by the overflow downdraw method, but the present invention may preferably be applied to a case of using a forming device 2 for successively forming the glass film G by a so-called redraw method, in which a solidified glass base material for secondary processing is heated and drawn.

Further, in the embodiments described above, the glass film G whose widthwise end region is successively cleaved while being delivered along the horizontal conveyance section 5 to the downstream side is rolled into a roll shape, but the present invention may preferably be applied to a case where the widthwise end region of the glass film G delivered along the horizontal conveyance section 5 to the downstream side is not cleaved and the glass film G is rolled into a roll shape in this state (case where the cleaving area A2 is not provided).

EXAMPLE

A confirmatory test was conducted to demonstrate usefulness of the present invention. In this confirmatory test, the manufacturing apparatus 1 having the structure illustrated in FIG. 1 was used, and glass films G having thicknesses of 100 µm and 50 µm were successively formed by the forming device 2 and continuously delivered to the downstream side by the horizontal conveyance section 5. Further, the glass films G were rolled by the rolling device 6. Under the condition described above, confirmation was made on the degree of the tensile force imparted to the glass film G interposed between the horizontal conveyance section 5 and the rolling device 6, and on the frequency of weaving occurring in the glass roll Gr, in accordance with the type of the endless belt 11 used as the support section S. In the confirmatory test, there were prepared five types of endless belts 11 having coefficients of static friction on the glass film G of 0.2, 0.6, 1.0, 1.6, and 3.2, and the frequency of weaving was evaluated in the following three levels: "Δ: weaving occurred on rare occasions"; "○: weaving occurred on fairly rare occasions"; and "◎: no weaving occurred". Further, in the confirmatory test, the glass roll Gr was obtained by rolling the glass film G by a force equal to or less than the static friction force, which was generated by the self-weight of the glass film G between the glass film G and each endless belt 11. Tables 1 and 2 respectively show results of the confirmatory test in the case where the glass film G having a thickness of 100 µm was successively formed and the case where the glass film G having a thickness of 50 µm was successively formed. Note that, although omitted in Tables 1 and 2, surface properties (surface quality) of the glass film G were highly satisfactory in both the cases.

TABLE 1

| Coefficient of static friction | Tensile force [N] | Frequency of weaving |
| --- | --- | --- |
| 0.2 | 7 | Δ |
| 0.6 | 18 | Δ |
| 1.0 | 39 | ○ |
| 1.6 | 60 | ○ |
| 3.2 | 120 | ◎ |

TABLE 2

| Coefficient of static friction | Tensile force [N] | Frequency of weaving |
| --- | --- | --- |
| 0.2 | 4 | Δ |
| 0.6 | 12 | Δ |
| 1.0 | 21 | ○ |
| 1.6 | 35 | ○ |
| 3.2 | 62 | ◎ |

On the other hand, as a comparative example for the above-mentioned confirmatory test (example), an air float device was used as the horizontal conveyance section 5, and the glass film G supported by the air float device in a floating manner (supported in a non-contact manner) was sequentially rolled to obtain the glass roll Gr. That is, the glass film G was sequentially rolled under a state in which the frictional force, which was generated between the horizontal conveyance section 5 and the glass film G, was substantially zero. In the glass roll Gr obtained in this manner, the weaving occurred highly frequently. Further, as the comparative example for the above-mentioned example, in each of the cases where the above-mentioned five types of endless belts 11 were used, the glass film G was rolled by a large rolling force exceeding the static friction force, which was generated by the self-weight of the glass film G between the glass film G and each endless belt 11. In this case, even when any endless belt 11 was used, a small scratch or the like was formed on the surface of the glass film G, and it was apparent that the glass film G (glass roll Gr) of the comparative example was inferior in surface quality to the glass film G (glass roll Gr) obtained by employing the structure of the present invention. Further, the rolling force exceeding the static friction force was not constant, and hence the weaving occurred highly frequently.

From the test results described above, it was demonstrated that the present invention was effective in obtaining a glass roll having a high surface quality and a low risk of weaving. In particular, from the test results shown in Tables 1 and 2, it was demonstrated that the use of the support section S having a coefficient of static friction on the glass film of 1.0 or more was effective in reducing the frequency of weaving of the glass roll Gr effectively.

REFERENCE SIGNS LIST 1 manufacturing apparatus
2 forming device 3 conveyance device
4 curved conveyance section
5 horizontal conveyance section
6 rolling device
10 conveyor
11 endless belt (support section)
12 rotator
13 chamber
15 support sheet (support section)
G glass film
Gr glass roll
S support section

The invention claimed is:

1. A manufacturing method for a glass roll, the method comprising:

drawing a glass film downward vertically from a forming device;

converting a delivery direction along a longitudinal direction of the glass film from a vertical direction to a horizontal direction;

continuously delivering the glass film to a downstream side using a horizontal conveyance section extending in the horizontal direction and including a support section, a drive speed of the support section being set substantially equal to a forming rate of the glass film by the forming device; and rolling the glass film into a roll shape on a downstream side of the horizontal conveyance section, so as to impart a horizontally-directed linear tensile force along the longitudinal direction of the glass film to a region of the glass film interposed on the downstream side of the horizontal conveyance section during said rolling the glass film by imparting a rolling force to the glass film while the glass film is supported in surface contact with the support section of the horizontal conveyance section, the rolling force being equal to or less than a static friction force which is generated by a self-weight of the glass film between the glass film and the support section, wherein the horizontal conveyance section comprises a support sheet serving as the support section, the support sheet being fed from a support sheet roll and driven by a drive section in contact with the support sheet, and wherein, after a state of contact between the support sheet and the glass film is released, the drive of the support sheet by the drive section is released, the support sheet moves to a retreating position that is spaced apart from the drive section, and the support sheet is discarded without re-contacting the glass film.

2. The manufacturing method of claim 1, wherein the drive section drives a part of the support sheet, which is supporting the glass film in surface contact, under a state in which movement of the part of the support sheet relative to the drive section in a width direction of the glass film is restricted.

3. The manufacturing method of claim 1, wherein the support section has a coefficient of static friction on the glass film of 1.0 or more.

4. The manufacturing method of claim 1, further comprising forming the glass film by an overflow downdraw method or a redraw method.

5. The manufacturing method of claim 1, further comprising forming the glass film into a thickness of 1 μm or more and 300 μm or less.

* * * * *